United States Patent
Morise

(10) Patent No.: US 7,374,121 B2
(45) Date of Patent: May 20, 2008

(54) FISHING REEL COMPONENT

(75) Inventor: Taisei Morise, Sakai (JP)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 11/476,764

(22) Filed: Jun. 29, 2006

(65) Prior Publication Data

US 2007/0029427 A1    Feb. 8, 2007

(30) Foreign Application Priority Data

Jul. 20, 2005    (JP) .............................. 2005-210536

(51) Int. Cl.
*A01K 89/01*    (2006.01)
(52) U.S. Cl. ...................... 242/318; 242/322
(58) Field of Classification Search ................ 242/317, 242/318, 312, 322
See application file for complete search history.

(56) References Cited

U.S. PATENT DOCUMENTS

| | | | | |
|---|---|---|---|---|
| 2,865,662 A * | 12/1958 | Nurmse | ...................... | 242/318 |
| 4,535,953 A | 8/1985 | Omori | | |
| 4,651,945 A * | 3/1987 | Ruin | .......................... | 242/318 |
| 5,456,418 A * | 10/1995 | Hitomi | ........................ | 242/322 |
| 6,089,484 A * | 7/2000 | Zwayer et al. | ............... | 242/321 |
| 6,382,544 B1 * | 5/2002 | Park | ............................ | 242/303 |
| 6,655,622 B2 * | 12/2003 | Kitajima et al. | ............. | 242/322 |
| 6,857,589 B2 * | 2/2005 | Kitajima | ...................... | 242/318 |
| 2004/0104291 A1 * | 6/2004 | Kitajima | ...................... | 242/322 |

FOREIGN PATENT DOCUMENTS

| | | |
|---|---|---|
| EP | 1 425 966 A1 | 6/2004 |
| JP | U-06-068447 | 9/1994 |
| JP | 2000-166440 | 6/2000 |
| JP | A-2000-201600 | 7/2000 |
| JP | 2001-017038 | 1/2001 |

* cited by examiner

*Primary Examiner*—Evan Langdon
(74) *Attorney, Agent, or Firm*—Global IP Counselors, LLP

(57) ABSTRACT

A fishing reel component includes a boss, a spring member, a lid member, a push button and spring arrangement member. The boss forms a boss through hole and a mounting space. The spring member is mounted in the mounting space. The spring member includes first and second engagement portions arranged to oppose each other. The lid member is fixed to the boss to retain the spring member and cover the mounting space. The push button includes a plurality of tapered portions. The tapered portions protrude from the push operation portion in the axial direction. The spring arrangement member arranges the spring member between the lid member and the spring arrangement member. The spring arrangement member includes a plurality of first through holes with each of the first through holes being configured for one of the tapered portions to pass therethrough.

10 Claims, 8 Drawing Sheets

FISHING REEL COMPONENT

CROSS-REFERENCE TO RELATED APPLICATIONS

This application claims priority under 35 U.S.C. § 119 to Japanese Patent Application No. 2005-210536. The entire disclosure of Japanese Patent Application No. 2005-210536 is hereby incorporated herein by reference.

BACKGROUND OF THE INVENTION

1. Field of the Invention

The present invention generally relates to a fishing reel component. More specifically, the present invention relates to a fishing reel component that can be detached from a shaft member or reattached to a shaft member of a fishing reel with a one-touch operation.

2. Background Information

A spool or fishing reel component for a spinning reel has been known which is detached from a spool shaft or reattached to a spool shaft or a shaft member with a one-touch operation performed by pushing a push button. (See, for example, Japan Utility Model Application Publication JP-U-06-068447.) A conventional one-touch detachable/reattachable spool is detachably mounted to a spool shaft. The one-touch detachable/reattachable spool has a tapered surface formed on a tip thereof and an annular groove formed to a rear of the tapered surface.

On the other hand, a spool or a fishing reel component for a single-bearing reel has been known which is detached/reattached from/to a spool shaft or a shaft member with a one-touch operation performed by moving a lever. (See, for example, Japan Patent Application Publication JP-A-2000-201600.)

According to the conventional art described in Japan Utility Model Application Publication JP-U-06-068447, the spool includes a spool unit, a spring member, a lid member and a push button. The spool unit includes a mounting space formed in a pass-through portion through which a spool shaft passes and an end surface through which a sprocket shaft passes. The spring member is arranged in the mounting space and is capable of engaging with an annular groove in the spool shaft. The lid member is mounted on a front portion of the spool unit to retain the spring member. The push button serves to disengage the spring member from the annular groove.

The mounting space is a circular space concentrically arranged around the pass-through portion. The spring member is a resilient wire member that is bent into a shape. The spring member includes a pair of engagement portions that are arranged to face with each other so that they are engaged with the annular groove. The spring member further includes a C-shaped connecting portion that connects an end of one of the pair of engagement portions to an end of the other of the pair of engagement portions so that the other ends of the pair of engagement portions are wrapped around. The spring member is engaged with the annular groove and urges the push button in a direction opposite to the direction in which the push button is pushed.

The push button is mounted on the outer circumferential side of the spool shaft, and is also mounted in the mounting space so that it is movable forward and backward and can pass over the annular groove. The push button includes a pair of tapered portions that are mounted between the engagement portions and formed on an end of the push button so that the gap between the pair of engagement portions is widened by movement of the push button in the axial direction. The push button further includes a push operation member that is exposed outward from the center of the lid member. The engagement between the annular groove of the shaft member and the spring member is released by pushing the push operation member. The push operation member is a tubular member with a bottom. The pair of tapered portions has internal diameters that are smaller than the diameter of the push operation member and larger than that of the spool shaft. In addition, the shape of the pair of tapered portions is just like a mountain shape formed by obliquely cutting the tubular member extended from the bottom of the push operation member into folding-fan shapes. When mounted, the pair of tapered portions is arranged opposite from each other so that the spool shaft is arranged between them. The tips of the tapered portions are inserted between the pair of engagement portions in a state in which they are urged by the spring member. The lid member is screwed into the spool unit, for example, and also retains the push button.

When the push button is pushed toward the spool shaft, the tapered portions expand the gap between the engagement portions of the spring member. Thus the engagement between the spool and the spool shaft is released to be in a detachable/reattachable state. In this state, the spool is detached from the spool shaft. In addition, when the pair of engagement portions is expanded by the tapered portions, the engagement portions apply force to the tapered portions in a direction that the engagement portions approach with each other. Accordingly, the push operation member is urged in a direction opposite to the direction in which the push operation member is pushed. Because of this, when the push operation is stopped, the push button will move in the opposite direction, and the pair of engagement portions will return to a state in which they can be engaged with the spool shaft.

When the spool is mounted to the spool shaft, the engagement portions of the spring member are spread apart by means of the tapered surface of the spool shaft. Then, when the spring member is positioned in the annular groove, the engagement portions grasp the annular groove to thereby retain the spool on the spool shaft.

According to the conventional structure described in the Japan Patent Application Publication JP-A-2000-201600, the annular groove is formed on the spool shaft on a tip side of a bearing supported by the spool member. In addition, a lever member is mounted on the spool unit so that it can move in an engagement position in which the lever member is engaged with the annular groove and a remote position in which the lever member is distant from the annular groove. Furthermore, a handle exposed outside the spool is attached to the lever member. The lever member is moved to the remote position by manual operation of the handle. Thus the spool is detached form the spool shaft. The lever member is urged to the engagement position side by a plate spring. According to the structure described in the Japan Patent Application Publication JP-A-2000-201600, the release operation of the spool can be performed by moving the lever member. Therefore, the length of the structure in the spool shaft direction can be formed to be relatively short. However, the moving operation of the lever member is necessary for the structure. Therefore, it is less convenient to perform the detachment/reattachment operation of the spool in the structure, compared to the release operation performed by pushing a push button.

If a one-touch detachable/reattachable structure of the conventional art described in the Japan Utility Model Application Publication JP-U-06-068447, that is, the one-touch detachable/reattachable structure in which the spool can be detached/reattached from/to a spool shaft by a push button used to easily perform a detachment/reattachment operation, is applied to a detachable/reattachable structure of the spool of the single-bearing reel of the conventional art described in the Japan Patent Application Publication JP-A-2000-201600, the axial length of the spool is formed to be longer. In other words, in a detachable/reattachable structure using the push button, the push button that has a tapered member and is formed to be longer in the axial direction is required to be moved further in the axial direction. Therefore, the length of the detachable/reattachable structure in the axial direction is formed to be longer. This type of detachable/reattachable structure has to be arranged on the tip side of the bearing in the axial direction. Accordingly, there is a possibility that the push button protrudes from the end surface of the spool.

In view of the above, it will be apparent to those skilled in the art from this disclosure that there exists a need for an improved one-touch operation fishing reel component with a shortened length of the detachable/reattachable structure in the axial direction. This invention addresses this need in the art as well as other needs, which will become apparent to those skilled in the art from this disclosure.

SUMMARY OF THE INVENTION

A fishing reel component pertaining to a first aspect of the present invention is a fishing reel component including a component unit, a spring member, a lid member, a push button and a spring arrangement member. The component unit forms a through hole and a mounting space. The through hole is configured for a shaft member to pass therethrough. The mounting space is formed at an end surface of the component unit and configured for the shaft member to pass therethrough. The spring member is mounted in the mounting space. The spring member includes first and second engagement portions arranged to oppose each other and configured to engage an annular groove at a tip of the shaft member. The lid member is fixed to the component unit to retain the spring member and cover the mounting space. The push button includes a push operation portion and a plurality of tapered portions. The push operation portion is movably mounted to the lid member in an axial direction and outwardly exposed from a center of the lid member. The tapered portions are provided to protrude from the push operation portion in the axial direction. Each of the tapered portions have a tip inserted between the first and second engagement portions. The tapered portions are configured and arranged to expand a gap between the first and second engagement portions by movement of the tapered portions in the axial direction so that the engagement of the spring member and the annular groove of the shaft member is released by pushing the push operation portion. The spring arrangement member is provided for arranging the spring member between the lid member and the spring arrangement member. The spring arrangement member includes a plurality of first through holes. Each of the first through holes is configured for one of the tapered portions to pass therethrough.

In this fishing reel component, for example, although the spring arrangement member functioning as a bearing is provided for the shaft member, the pair of tapered portions of the push button are arranged to pass through the first through hole of the spring arrangement member. Then, when the push button is pushed, the tapered potion expands the engagement portion of the spring member arranged between this spring arrangement member and the lid member. Thus the engagement portion is removed from the annular groove. Accordingly, the fishing reel component can be removed from the shaft member. Here, the first through hole is formed in the spring arrangement member so that the pair of tapered portions can pass through the spring arrangement member. Therefore, the spring arrangement member and the push button are arranged to be overlapped in the axial direction by arranging the tapered portion so that it passes through the first through hole of the spring arrangement member. Accordingly, it is possible to shorten the length of the detachable/reattachable structure using the push button in the axial direction.

The fishing reel component pertaining to a second aspect of the present invention is the fishing reel component according to the first aspect of the present invention, wherein the mounting space is coaxially formed with the pass-through portion to be in a round shape and the spring member is composed of a resilient wire. In addition, the fishing reel component includes a C-shaped connecting portion that connects an end of one of the pair of engagement portions and an end of the other of the pair of engagement portions and also wraps around the other end of one of the pair of engagement portions and the other end of the other of the pair of engagement portions. In this configuration, the pair of engagement portions are connected by the C-shaped connecting portion. Therefore, the shape of the spring member becomes approximately a round shape. In addition, the mounting space is coaxially formed with the pass-through portion and also formed to be in a round shape. Therefore, it becomes easy to mount the spring member engaged with the annular groove of the shaft member to the mounting space by the engagement portions.

The fishing reel component pertaining to a third aspect of the present invention is the fishing reel component according to the first aspect or the second aspect of the present invention, wherein the spring arrangement member is a bearing for rotatably supporting the component unit with respect to the shaft member. In this configuration, even if the component unit is rotatably supported by the bearing, it is possible to shorten the length of the detachable/reattachable structure in the axial direction.

The fishing reel component pertaining to a fourth aspect of the present invention is the fishing reel component according to one of the first through third aspects of the present invention, wherein the push operation portion has a tubular member and a bottom portion. The tubular member is movably mounted to the lid member in the axial direction, and at least a portion of the tubular member is arranged on the outer circumferential side of the shaft member. The bottom portion is formed integrated with an end of the tubular portion and exposed outward from the center of the lid member. In addition, the pair of tapered portions is formed by cutting a- portion of the tubular member. In this configuration, the tapered portion is formed on the tubular portion of the push button. Therefore, the length of the push button in the axial direction is shortened, compared to a configuration in which the tubular portion and the tapered portion are separately provided. Thus it is possible to further shorten the length of the detachable/reattachable structure using the push button in the axial direction.

The fishing reel component pertaining to a fifth aspect of the present invention is the fishing reel component according to one of the first through fourth aspects of the present invention, wherein the push button further includes a pair of guide portions that is arranged between the pair of tapered portions to be apart from the tapered portion at a predetermined space in the circumferential direction. In addition, the spring arrangement member further includes a pair of second through holes through which the pair of guide portions respectively can pass. In this configuration, the push button is supported by the lid member even in the guide member. Therefore, the push button comes to be able to smoothly move in the axial direction.

The fishing reel component pertaining to a sixth aspect of the present invention is the fishing reel component according to the fifth aspect of the present invention, wherein the spring arrangement member is mounted to the component unit to be prevented from being rotated. In addition, the pair of second through holes limits the position of the pair of guide portions so that tips of the pair of tapered portions are arranged between the pair of engagement portions of the spring member. In this configuration, the spring member is mounted to the component unit in a predetermined circumferential position, and the circumferential position of the guide portion is limited by the second through hole. Therefore, when the guide portion is passed through the second through hole, the pair of tapered portions are arranged in a certain circumferential position. Because of this, it becomes easy to arrange the tapered portion between the engagement portions of the spring member in assembling.

The fishing reel component pertaining to a seventh aspect of the present invention is the fishing reel component according to one of the first through sixth aspects of the present invention, wherein the spring arrangement member has a plurality of positioning protrusions that can position the spring member in the circumferential position and can be arranged in the mounting space. In this configuration, the circumferential position of the spring member is determined to a predetermined phase. Therefore, it becomes easy to arrange the tapered portion between the engagement portions of the spring member in assembling. In particular, if the tapered portion is regulated so that it can be arranged in a certain circumferential position, the tapered portion can be arranged between the engagement portions only by arranging the push button after arranging the spring member. Thus it further becomes easy to assemble the fishing reel component.

The fishing reel component pertaining to an eighth aspect of the present invention is the fishing reel component according to the first through seventh aspects of the present invention, wherein the push button further includes a retaining protrusion that is formed on the other end of the tubular member and prevents the push button from coming away the lid member outward. In this configuration, even if the push button is urged by the spring member in the direction that the push button comes away, the push button does not come away the lid member.

The fishing reel component pertaining to a ninth aspect of the present invention is the fishing reel component according one of the first through eighth aspects of the present invention, wherein the shaft member is a spool shaft fixedly mounted to the reel unit of the single-bearing reel as the fishing reel. The component unit is a spool unit of the single-bearing reel which is rotatably and detachably/reattachably mounted to the spool shaft, and on the outer circumference of which a fishing line is wound. In this configuration, even if a detachable/reattachable structure using a push button is applied to a single-bearing reel, the length of the detachable/reattachable structure is shortened in the axial direction. Therefore, the push button easily protrudes from the end surface of the spool.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
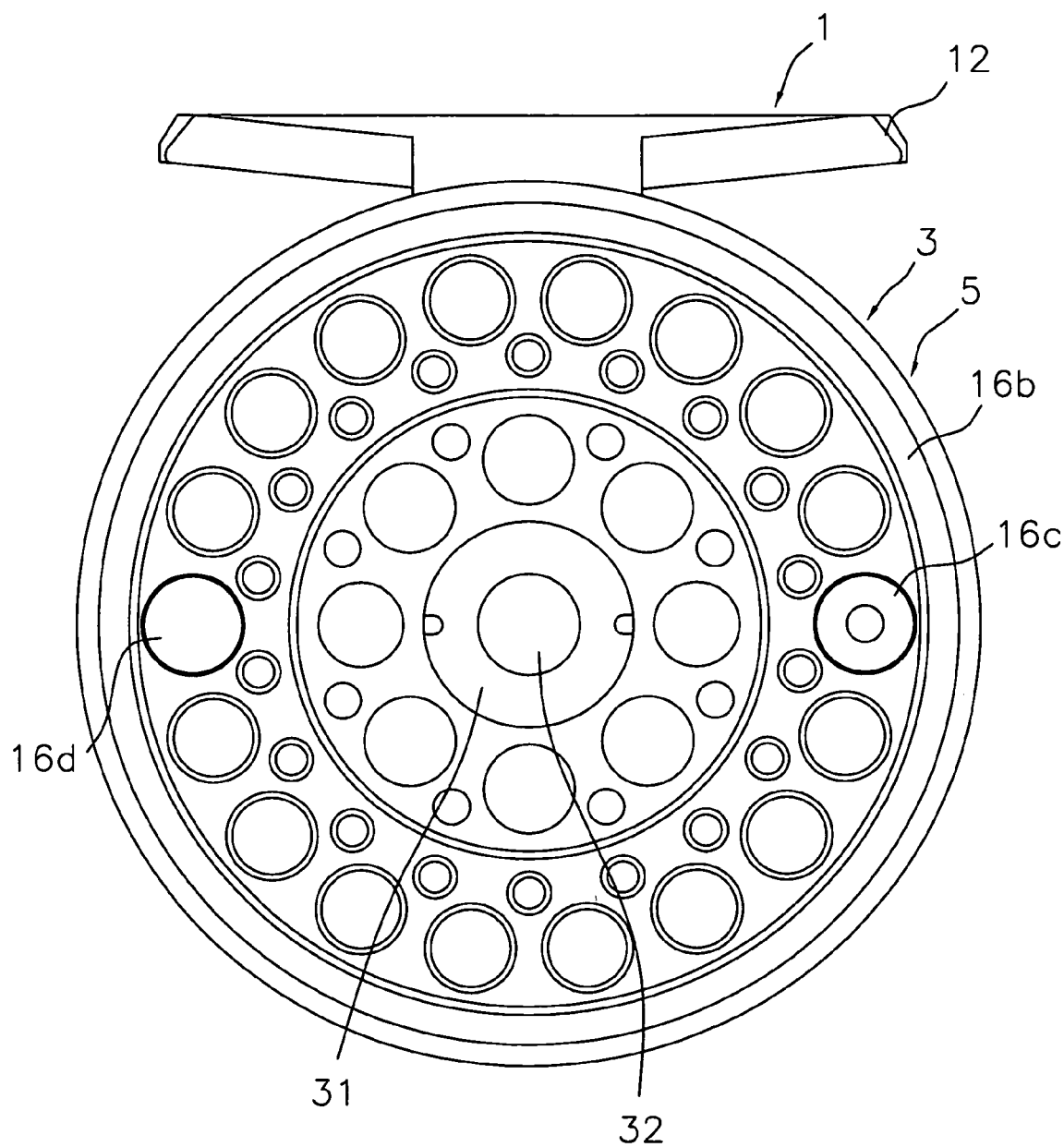
FIG. 1 is a front view of a single-bearing reel having a fishing reel component in accordance with a first embodiment of the present invention.
Figure 2:
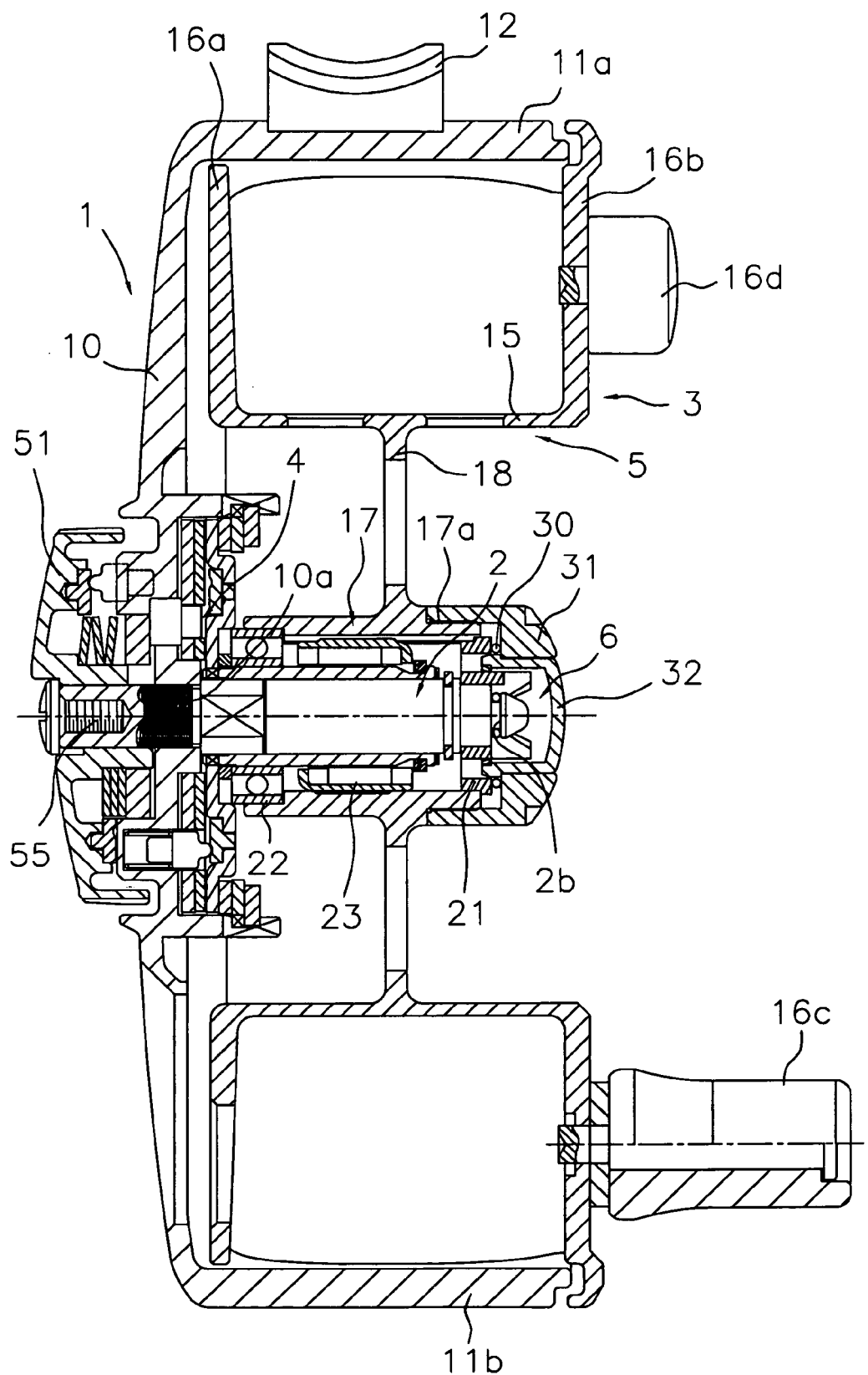
FIG. 2 is a side cross-sectional view of the single-bearing reel with the fishing reel component in accordance with the first embodiment of the present invention.
Figure 3:
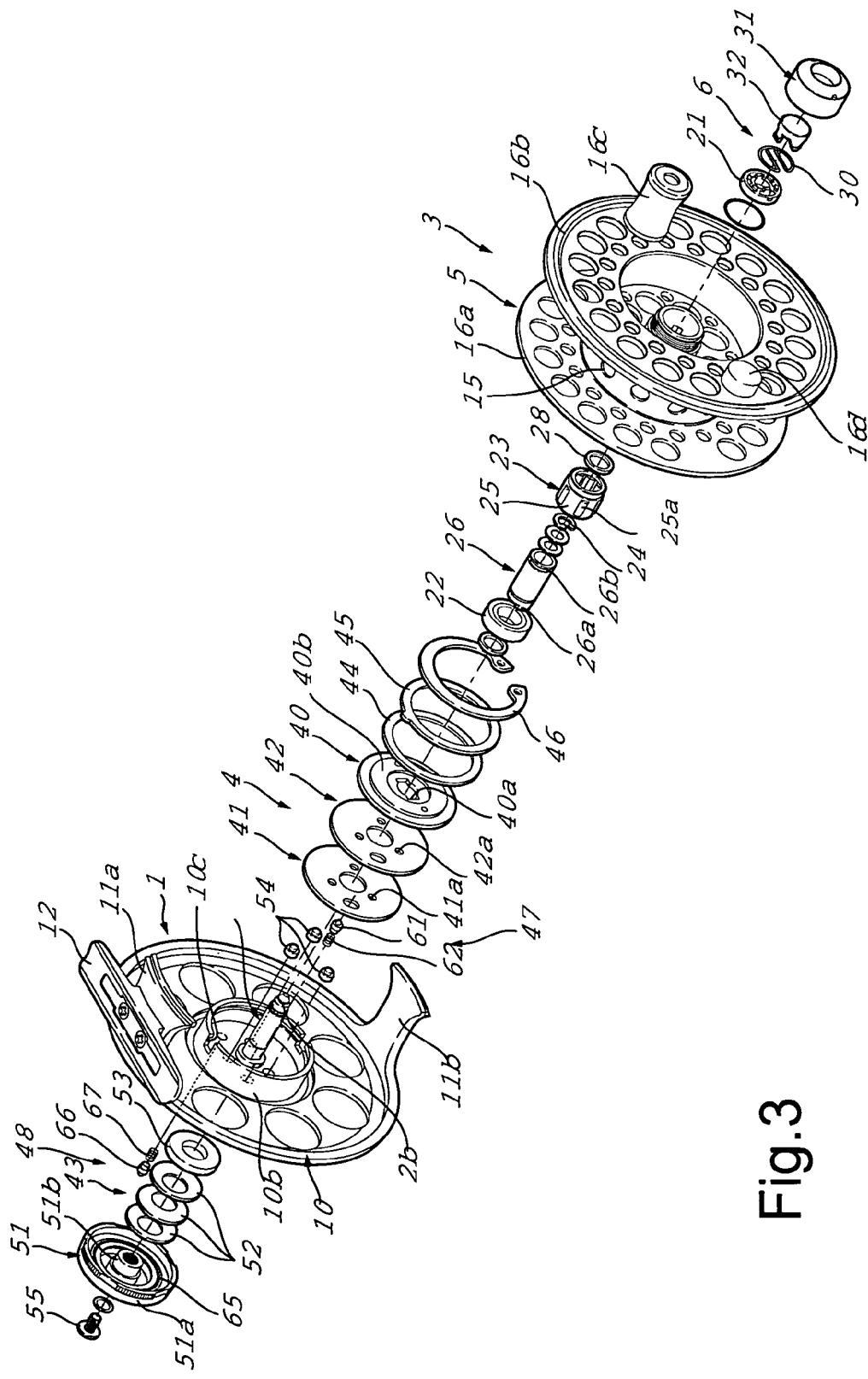
FIG. 3 is an exploded perspective view of the single-bearing reel with the fishing reel component in accordance with the first embodiment of the present invention.

FIGS. 1-3 show a single-bearing reel according to an embodiment of the present invention. As shown in FIGS. 1-3, the single-bearing reel includes a reel unit 1, a spool shaft or a shaft member 2, a spool 3 and a drag mechanism 4. The spool shaft 2 is cantilevered arid supported by the reel unit 1. The spool or fishing reel component 3 is rotatably arranged vis-à-vis the spool shaft 2. A fishing line is reeled onto an outer circumference of the spool 3. The drag mechanism 4 brakes rotation of the spool 3 in one direction.

Figure 4:
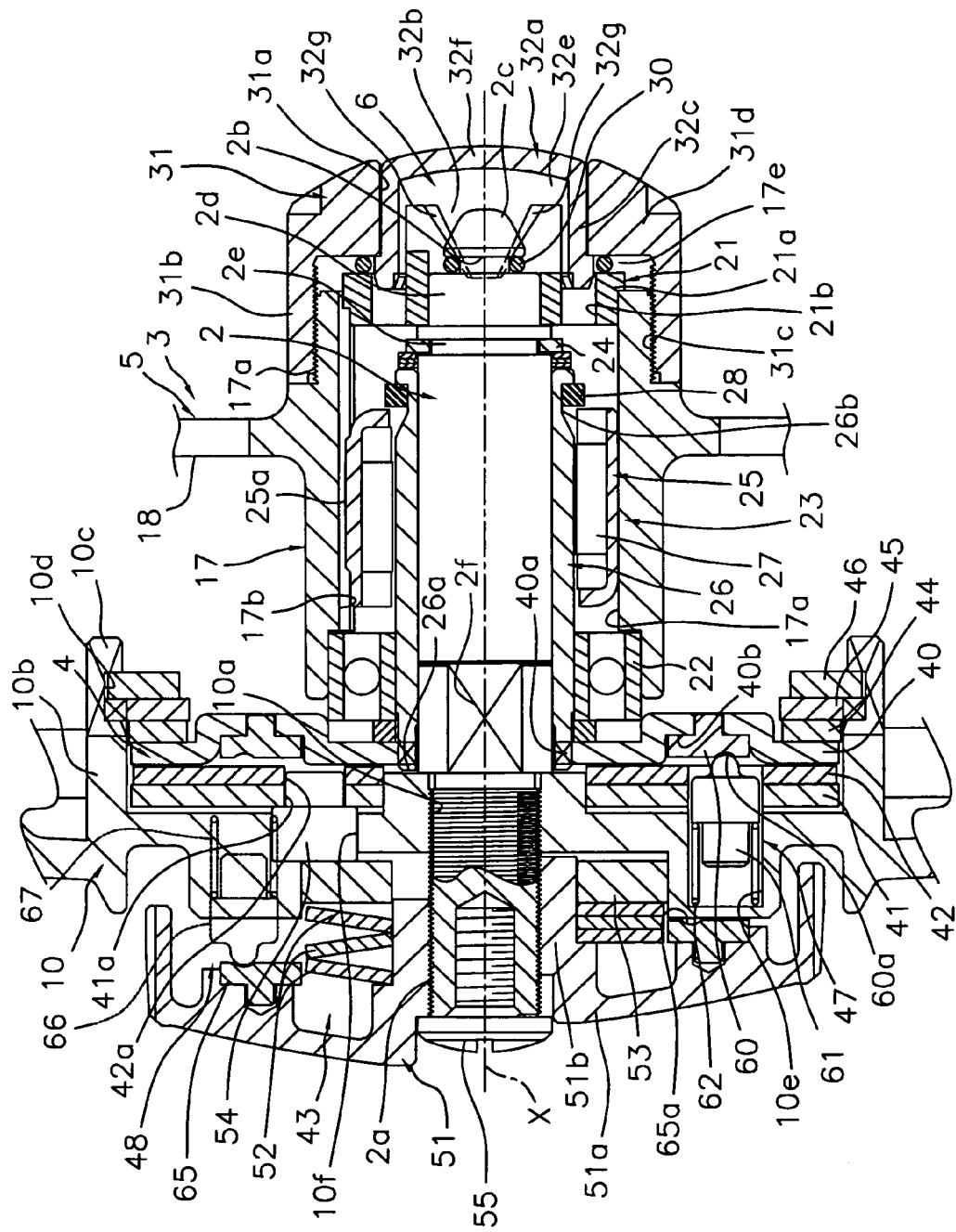
FIG. 4 is an enlarged cross-sectional view of the single-bearing reel with the fishing reel as shown in FIG. 2 in accordance with the first embodiment of the present invention.

The reel unit 1 has a disk-shaped side plate 10 on one side (i.e., the left side in FIG. 2). The reel unit 1 is open on the other side. The reel unit 1 further has upper and lower protection portions 11a and 11b and an attachment member 12. The upper and lower protection portions 11a and 11b are formed on an outer circumference of the side plate 10. The upper and lower protection portions 11a and 11b are arranged at a predetermined distance in a circumferential direction and project in an axial direction. The attachment member 12 is mounted on the upper protection portion 11a for mounting the single-bearing reel on a fishing rod. As shown in FIGS. 2-4, the side plate 10 includes a female threaded hole 10a, a tubular drag-housing portion 10b, a pair of slits 10c, an annular drag engagement groove 10d, a concave portion 10e and three through holes 10f. The female threaded hole 10a serves to fix the spool shaft 2 and is formed in a center of the side plate 10. The tubular drag-housing portion 10b is formed on an inner surface of an outer circumferential side of the female threaded hole 10a so that it is radially arranged with the female threaded hole 10a. The pair of slits 10c is formed on a diameter of the drag-housing portion 10b. The annular drag engagement groove 10d is formed on an inner circumferential surface of a slit formation portion of the drag-housing portion 10b. The concave portion 10e is formed on the inner surface of the side plate 10 in the axial direction. The three through holes 10f are formed in the side plate 10 at equal spaces in the circumferential direction.

As shown in FIGS. 3 and 4, the spool shaft 2 includes a male threaded portion 2a, a first annular groove 2b, a tapered head 2c, a bearing support portion 2d, a second annular groove 2e and a plurality of chamfered portions 2f. The male threaded portion 2a is formed on a base-end of the spool shaft 2. The male threaded portion 2a is threaded into the female threaded hole 10a of the side plate 10. The male threaded portion 2a protrudes outward from the center of the side plate 10 of the reel unit 1. The first annular groove 2b and the tapered head 2c are formed on a tip of the spool shaft 2. The tapered head 2c has a diameter that is larger than a diameter of the first annular groove 2b. The bearing support portion 2d is formed adjacent to the first annular groove 2b. The second annular groove 2e is formed on a base-end side of the bearing support portion 2d. A diameter of a base-end side of the bearing support portion 2d is larger than that of the rest of the bearing support portion 2d. Furthermore, the chamfered portions 2f are mutually parallel. The chamfered portions 2f are formed adjacent to the male threaded portion 2a on a base-end side of the second annular groove 2e. The spool shaft 2 is threaded into the side plate 10 by interlocking the chamfered portions 2f with a hardware such as a spanner.

As shown in FIGS. 1-4, the spool 3 has a spool unit or a component unit 5 and a one-touch detachable/reattachable mechanism 6. The one-touch detachable/reattachable mechanism 6 is used for detaching the spool unit 5 from the spool shaft 2 with a one-touch operation. The spool unit 5 includes a tubular bobbin trunk 15, a disk-shaped inner flange 16a, an outer flange 16b, a handle 16c, a balance weight 16d, a boss 17 and a disk-shaped connector 18. The inner flange 16a is integrally formed with one end of the bobbin trunk 15. The outer flange 16b is integrally formed with the other end of the bobbin trunk 15 to cover an open portion of the reel unit 1. The boss 17 is arranged on an inner circumferential side of the bobbin trunk 15. The disk shaped connector 18 connects the bobbin trunk 15 and the boss 17. A plurality of circular through holes are formed in the bobbin trunk 15, the inner flange 16a, the outer flange 16b and the connector 18 in order to reduce the weight of the single-bearing reel and improve the design of the single-bearing reel. The inner flange 16 is formed to oppose the side plate 10 of the reel unit 1. The outer flange 16b is formed to have a diameter larger than a diameter of the inner flange 16a. The handle 16c and the balance weight 16d are mounted on an outer surface of the outer flange 16b. The handle 16c and the balance weight are symmetrically arranged with respect to a center of the outer flange 16b.

Figure 5:
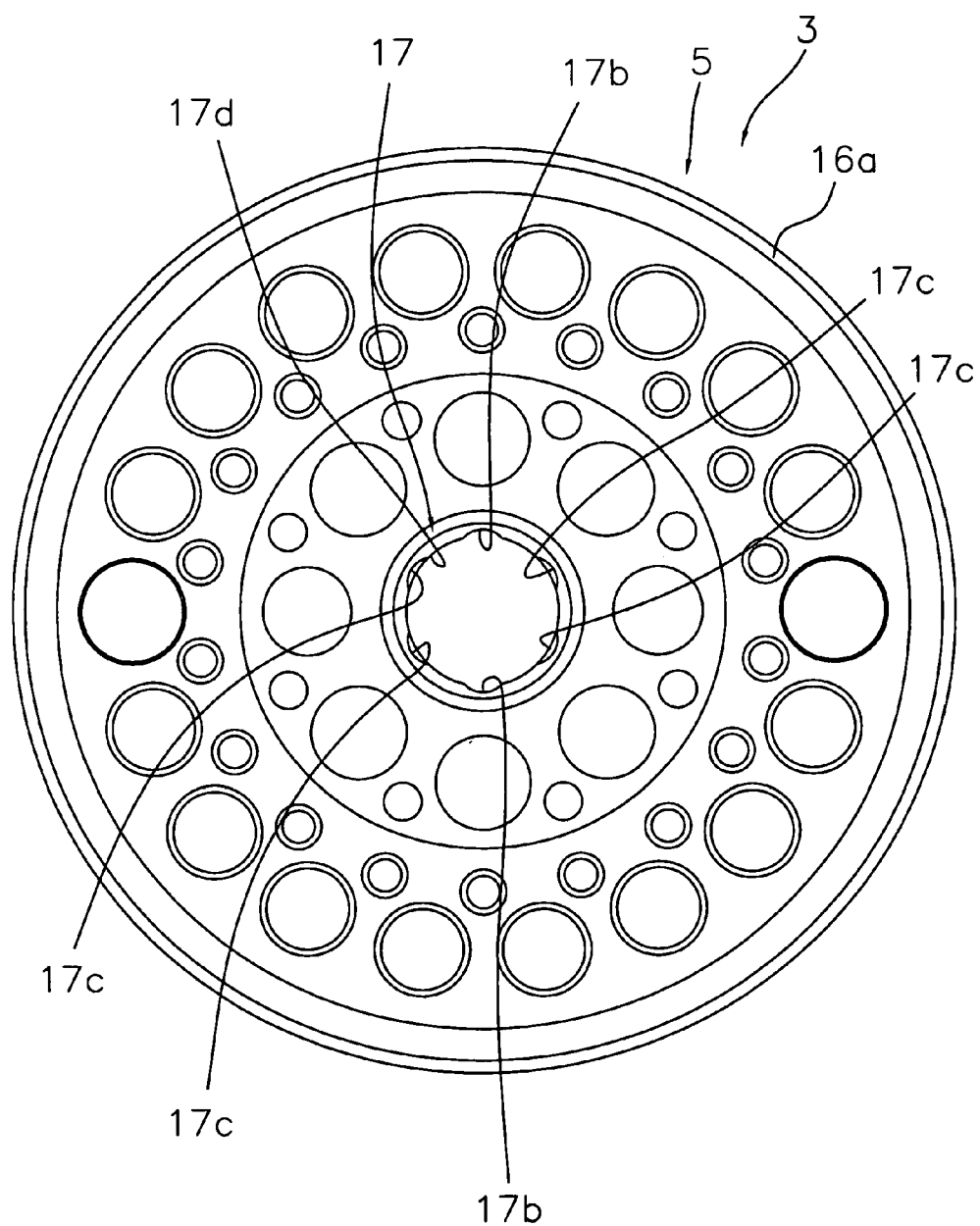
FIG. 5 is a back view of a spool unit of the single-bearing reel with the fishing reel component in accordance with the first embodiment of the present invention.

The boss or component unit 17 includes a female threaded portion 17a, first engagement grooves 17b, second engagement grooves 17c, a boss through hole 17d and a disk-shaped mounting space 17e. The boss through hole 17d is formed in the boss 17 such that the boss 17 is a tubular member. The spool shaft 2 passes through the boss through hole 17d. A tip side of the boss 17 is covered with a lid member 31 that includes the one-touch detachable/reattachable mechanism 6. The mounting space 17e is formed at an end surface of the boss 17 and is configured for the spool shaft 2 to pass therethrough. The mounting space 17e is coaxial with the boss through hole 17d. The female threaded portion 17a is formed on an outer circumferential surface of a tip of the boss 17. As shown in FIG. 5, two first engagement grooves 17b and four second engagement grooves 17c are formed in the boss through hole 17d of the boss 17. The first engagement grooves 17b are arranged on an inner diameter and are formed throughout the length of the boss 17 in the axial direction. The second engagement grooves 17c are formed from a base-end (i.e., the left end in FIG. 4) of the boss 17 to a predetermined position located between the base-end and a tip of the boss 17 in the axial direction. The first engagement grooves 17b and the second engagement grooves 17c are formed at positions equally dividing into six parts in the circumferential direction. The spool 3 is rotatably mounted to the spool shaft 2 by a ball bearing 22 and a sliding bearing 21. The ball bearing 22 is mounted to the base-end of the boss 17. The sliding bearing 21 is mounted to the tip of the boss 17. In addition, a roller clutch 23 is mounted between the sliding bearing 21 and the ball bearing 22.

The roller clutch 23 is detachably/reattachably mounted to the spool 3. The second engagement grooves 17c arrange the position of the roller clutch 23 in the axial direction. The roller clutch 23 is configured and arranged so that the drag mechanism 4 can be only actuated in a line release direction. As shown in FIG. 4, the roller clutch 23 has an outer race 25, an inner race 26 and a plurality of rollers 27. The outer race 25 is non-rotatably mounted to the first and second engagement grooves 17b and 17c. The roller clutch 23 is a one-way clutch with the freely rotating inner race 26. The inner race 26 is rotatably mounted to the spool shaft 2. Six of the rollers 27 are arranged between the outer and inner races 25 and 26 to contact the outer and inner races 25 and 26. The rollers 27 are mounted in the outer race 25 by a retainer (not shown).

The outer race 25 is a metal tubular member. Both ends of the outer race 25 are curved inwardly. An outwardly-curved convex cam surface (not shown) is formed on an inner circumferential surface of the outer race 25. The cam surface is formed so that the roller 27 extends between the inner race 26 and the outer race 25 on one end of the cam surface and is away from the outer and inner races 25 and 26 on the other end of the cam surface. The outer race 25 has an engagement protrusion 25a that is formed on an outer circumferential surface of the outer race 25. More specifically, the engagement protrusion 25a is formed in a position where the cam surface is formed. The engagement protrusion 25a is non-rotatably engaged with the first and second engagement grooves 17b and 17c. The engagement protrusion 25a may have a point contact or a surface contact with the boss 17 as long as the engagement protrusion 25a is non-rotatably engaged with the first and second engagement grooves 17b and 17c of the boss 17.

The inner race 26 is a metal tubular member. The inner race 26 extends toward a side plate side longer than the outer race 25. As shown in FIGS. 3 and 4, the inner race 26 has a plurality of engagement protrusions 26a and an annular concave portion 26b. A pair of the engagement protrusions 26a protrudes in the axial direction and is formed on a protruding end of the inner race 26. The pair of engagement protrusions 26a non-rotatably connects the drag mechanism 4 to the inner race 26. A retaining ring 24 that is engaged with the spool shaft 2 and a wall surface of the side plate 10 of the reel unit 1 prevent movement of the inner race 26 in the axial direction. The annular concave portion 26b is formed on a tip of the inner race 26. An elastic O-ring 28 regulates the movement of the outer race 25 in the axial direction. The O-ring 28 has a rectangular cross-sectional shape. The O-ring 28 is mounted to the annular concave portion 26b. An outer diameter of the O-ring 28 contacts the outer race 25. The annular concave portion 26b has a wall surface on a tip side (i.e., the right side in FIG. 4) of the annular concave portion 26b. The wall surface is on a plane perpendicular to the spool shaft 2. The annular concave portion 26b has a gentle tapered surface on a base-end side (i.e., the left side in FIG. 4).

The roller clutch 23 is kept attached to the spool shaft 2 with the ball bearing 22 when the spool 3 is detached. In addition, if a reverse-rotation prohibited direction of the roller clutch 23 is switched from a clockwise direction to a counterclockwise direction and vice versa, the outer race 25 and the rollers 27 can be integrally detached from the inner race 26. The outer race 25 and the rollers 27 also can be detached from the spool shaft 2 by detaching the O-ring 28 from the annular concave portion 26b. In this state, both sides of the detached components shown in FIG. 4 are reversed. The outer race 25 and the rollers 27 are integrated in the inner race 26 and then the O-ring 28 is reattached to the annular concave portion 26b. Thus, the outer race 25 is retained and the reverse rotation with respect to the rotation performed before both sides of the detached components shown in FIG. 4 are reversed will be prohibited.

Figure 6:
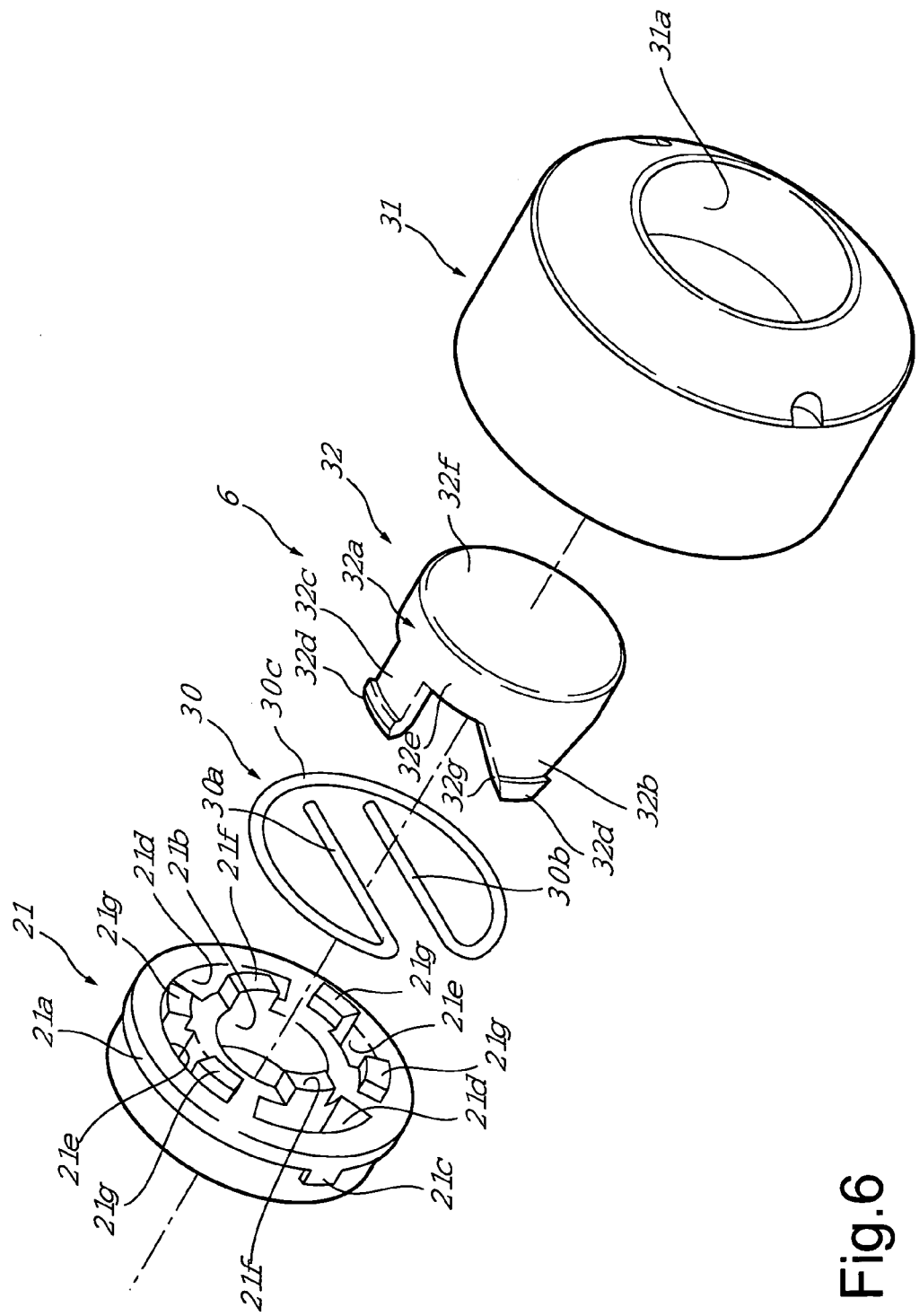
FIG. 6 is an exploded perspective view of a one-touch release structure of the single-bearing reel with the fishing reel component in accordance with the first embodiment of the present invention.

As shown in FIGS. 3, 4, and 6, the one-touch detachable/reattachable mechanism 6 includes a spring member 30, a lid member 31, a push button 32, and the sliding bearing 21. The spring member 30 is made from a resilient wire material that is engaged with the first annular groove 2b of the spool shaft 2. The lid member 31 is threaded onto the tip of the boss 17 so that the lid member 31 covers the mounting space 17e in order to retain the spring member 30. The push button 32 is movably mounted to the lid member 31 in the axial direction. The sliding bearing 21 functions as an arrangement member to arrange the spring member 30 between the sliding bearing 21 and the lid member 31.

The spring member 30 serves to non-movably mount the spool 3 to the spool shaft 2 in the axial direction. In addition, the spring member 30 also functions to urge the push button 32 forward (i.e., rightward in FIG. 4). An urging force is produced when the resilient wire material of the spring member 30 is deformed. As shown in FIG. 6, the spring member 30 includes first and second straight engagement portions 30a and 30b, and a C-shaped connecting portion 30c. The first and second engagement portions 30a and 30b are arranged to face each other so as to engage with the first annular groove 2b of the spool shaft 2. The connecting portion 30c connects an end of the first engagement portion 30a with an end of the second engagement portion 30b. The connecting portion 30c wraps around another end of the first engagement portion 30a and another end of the second engagement portion 30b. In addition, the spring member 30 is mounted in the mounting space 17e.

The lid member 31 includes a lid through hole 31a, a tubular portion 31b, a lid female threaded portion 31c and a bottom portion 31d. The lid through hole 31a movably supports the push button 32 in the axial direction. The lid through hole 31a is formed in a center of the lid member 31.

The lid female threaded portion 31c is formed on an inner circumferential surface of the tubular portion 31b. The lid female threaded portion 31c is threaded together with the male threaded portion 17a of the boss 17. The mounting space 17e is formed between an inner side of a bottom surface of the bottom portion 31d and the tip surface of the boss 17. An outer surface of the bottom portion 31d is spherically curved.

The push button 32 is used for detaching the spool 3 from the spool shaft 2. As shown in FIGS. 4 and 6, the push button 32 includes a push operation portion 32a, a plurality of tapered portions 32b, a plurality of guide portions 32c and a plurality of retaining protrusions 32d. The push operation portion 32a is outwardly exposed from the center of the lid member 31. A pair of the tapered portions 32b has tips that are inserted between the first and second engagement portions 30a and 30b of the spring member 30. The pair of tapered portions 32b is mounted to the push operation portion 32a to protrude in the axial direction. In addition, the pair of tapered portions 32b are arranged to interpose the spool shaft 2 so that the gap between the first and second engagement portions 30a and 30b is expanded due to its axial movement. Each of the tapered portions 32b has tapered surfaces 32g, which are formed on both sides of the tapered portion 32b in the circumferential direction. The guide portions 32c are disposed between the pair of tapered portions 32b. A pair of the guide portions 32c are arranged to be spaced apart from the pair of tapered portions 32b at a predetermined distance in the circumferential direction. The push button 32 serves to release the engagement of the spring member 30 with the first annular groove 2b of the spool shaft 2 when the push operation member 32a is pressed.

The push operation portion 32a includes a push button tubular portion 32e and a push button bottom portion 32f. The tubular portion 32e is movably mounted to the lid through hole 31a of the lid member 31 in the axial direction. A tip of the tubular portion 32e is arranged on the outer circumferential side of the tip of the spool shaft 2. The bottom portion 32f is outwardly exposed through the lid through hole 31 a of the lid member 31. The bottom portion 32f is integrally formed with an end of the push operation portion 32a. The pair of tapered portions 32b and the pair of guide portions 32c are formed by cutting out portions of the tubular portion 32e. A length of the tapered portion 32b is slightly shorter than that of the guide portion 32c. Therefore, the pair of tapered portions 32b and the pair of guide portions 32c also have a function of the tubular portion 32e. That is, the function that they are movably supported by the lid member 31 in the axial direction. The retaining protrusions 32d are formed on a tip of the tubular member 32e. The retaining protrusions 32d prevent the push button 32 from coming away from the lid member 31.

The sliding bearing or spring arrangement member 21 includes a bushing made of a hard, easy-sliding synthetic resin such as a polyacetal resin. As shown in FIG. 6, the sliding bearing 21 has a brim portion 21a, a contact surface 21b and a plurality of rotation stop protrusions 21c. The brim portion 21a is on an outer circumferential surface of the sliding bearing 21. The contact surface 21b is on an inner circumferential surface of the sliding bearing 21. The brim portion 21a contacts the tip surface of the boss 17. The contact surface 21b contacts the bearing support portion 2d of the spool shaft 2. The rotation stop protrusions 21c engage the first engagement groove 17b of the boss 17. The rotation stop protrusions 21c are formed in two predetermined positions on a diameter of a back side of the brim portion 21a.

Thus the sliding bearing 21 is non-rotatably mounted to the boss 17. The sliding bearing 21 is mounted on the bearing support portion 2d of the spool shaft 2 and supports the tip of the spool shaft 2.

The sliding bearing 21 further has a plurality of first through holes 21d, a plurality of second through holes 21e, a plurality of first positioning projections 21f and a plurality of second positioning projections 21g. The first and second through holes 21d and 21e penetrate the sliding bearing 21 in the axial direction. The push button 32 passes through the first and second through holes 21d and 21e. A pair of the first through holes 21d and a pair of the second through holes 21e are arranged along a diameter of the sliding bearing 21. The pair of tapered portions 32b including the retaining protrusions 32d pass through the pair of first through holes 21d. The pair of the guide portions 32c including the retaining protrusions 32d pass through the pair of second through holes 21e. The pair of first through holes 21d are circular arc shaped holes. The pair of second through holes 21e are circular arc shaped holes formed to accommodate the tapered surfaces 32g of the pair of guide portions 32c. The pair of second through holes 21e regulates the circumferential position of the push button 32 and stops turning of the push button 32. The first positioning projections 21f and the second positioning projections 21g both protrude toward the push button 32 in the axial direction. The first positioning projections 21f are formed on an inner circumferential side of the first through hole 21d. The second positioning projections 21g are formed on sides of the second through holes 21e in the circumferential direction. The first and second positioning protrusions 21f and 21g regulate the circumferential position of the spring member 30. Specifically, the first and second positioning projections 21f and 21g regulate the circumferential position of the spring member 30 so that the tapered portions 32b of the push button 32, prevented from being turned around by the second through holes 21e, are arranged between the first and second engagement portions 30a and 30b. The pair of second through holes 21e limits a position of the pair of guide portions 32c so that a pair of tips of the pair of tapered portions 32b is arranged between the first and second engagement portions 30a and 30b.

Thus, the first and second engagement portions 30a and 30b of the spring member 30 are arranged between the first positioning projection 21f and the second positioning projection 21g. Therefore, the tapered portion 32b is arranged between the first and second engagement portions 30a and 30b when the guide portion 32c of the push button 32 is just inserted into the second through hole 21e. Because of this, it is not necessary to consider the circumferential positions of the spring member 30 and the push button 32 in assembling, thereby facilitating assembly of the one-touch detachable/reattachable mechanism 6.

In addition, in this type of one-touch detachable/reattachable mechanism 6, the first through hole 21d is formed in the sliding bearing 21 so that the pair of tapered portions 32b pass through the sliding bearing 21. Therefore, the sliding bearing 21 and the push button 32 are arranged to overlap with each other in the axial direction when the tapered portion 32b is arranged to pass through the first through hole 21d. Because of this, the length of the one-touch detachable/reattachable mechanism 6 using the push button 32 is shortened in the axial direction.

Furthermore, the tapered portion 32b is formed to be integrated with the tubular portion 32e. Therefore, the length of the push button 32 in the axial direction is shorter in comparison to a configuration in which a tapered portion and a tubular portion are separately provided. Thus, the length of the one-touch detachable/reattachable mechanism 6 using the push button 32 is further shortened in the axial direction.

As shown in FIGS. 3 and 4, the drag mechanism 4 has a rotation disk 40, first and second brake disks 41 and 42, a pressure-contact mechanism 43, a drag ring 44, a ring 45 and a stop ring 46. The rotation disk 40 is non-rotatably engaged with the inner race 26. The first and second brake disks 41 and 42 are non-rotatably mounted to the reel unit 1 but are movable in the axial direction of the spool shaft 2. In addition, the first and second brake disks 41 and 42 contact the rotation disk 40. The pressure-contact mechanism 43 presses the first and second brake disks 41 and 42 on a base-end side (the left side in FIG. 4). The drag ring 44 is pressed to contact the rotation disk 40 on a side of the rotations disk 40 opposite the first brake disk 41. The ring 45 has an ear-like protrusion. The ring 45 is pressed to contact the drag ring 44. The stop ring 46 retains the ring 45.

A first sounding mechanism 47 is arranged between the rotation disk 40 and the first brake disk 41. The first sounding mechanism 47 makes a sound by relative rotation of the rotation disk 40 and the first brake disk 41 i.e., by a drag operation. In addition, a second sounding mechanism 48 is provided for the pressure-contact mechanism 43. The second sounding mechanism 48 makes a sound when the drag force is regulated.

The rotation disk 40 is a metal member composed of stainless steel, for example. The rotation disk 40 has a pair of engagement grooves 40a and a ring-shaped concave portion 40b. The engagement grooves 40a engage the engagement protrusion 26a of the inner race 26 on an inner circumference thereof. The concave portion 40b is formed on a central portion of the rotation disk 40 in the radial direction.

The first brake disk 41 is a metal member composed of stainless steel, for example. The first brake disk 41 has three first round holes 41a, for example. The first round holes 41a are formed in a center portion of the brake disk 41 in a radial direction. The first round holes 41a are also arranged at equal spaces in a circumferential direction. The second brake disk 42 is comprised of a fiber reinforced resin in which a thermoset resin is impregnated in a carbon fiber fabric, for example. The second brake disk 42 has three second round holes 42a, for example. The second round holes 42a are formed in a central portion of the second brake disk 42 in a radial direction. The second round holes 42a are also arranged at equal spaces in a circumferential direction. The first round holes 41a are formed in substantially the same radial positions in the first brake disk 41 as the second round holes 42a in the second brake disk 42.

The drag ring 44 is comprised of a fiber reinforced resin in which a thermoset resin is impregnated in a carbon fiber fabric, for example. The ring 45 having an ear-like protrusion is a metal member composed of stainless steel, for example. Also, the ring 45 is a washer with the ear-like protrusion being formed on an outer circumference thereof. The ear-like protrusion protrudes in the radial direction. The ear-like protrusion of the ring 45 is engaged with the pair of slits 10c formed in the drag-housing portion 10b. The stop ring 46 is a C-shaped stop ring mounted to the drag engagement groove 10d, for example. The stop ring 46 retains the ring 45 and serves to receive the pressing force from the pressure-contact mechanism 43.

Thus the drag ring 44 and the ring 45 are additionally provided for the rotation disk 40, and thereby the drag force can be increased. Therefore, it is possible to use common components as the drag mechanism components of multiple forms of single-bearing reels when the drag ring 44 and the ring 45 are additionally provided for the drag mechanism 4 in the large size single-bearing reel that requires a large drag force, and the drag mechanism is comprised of the rotation disk 40 and the first and second brake disks 41 and 42 in the small or middle size single-bearing reel.

Referring to FIGS. 3 and 4, the pressure-contact mechanism 43 has an operation knob 51, three disk springs 52, a washer 53, and three push pins 54 (only one of the push pins 54 is shown in FIG. 4). The disk springs 52 are pressed by the operation knob 51. The washer 53 is pressed by the disk springs 52. The push pins 54 are pressed by the washer 53. Referring to FIG. 4, a drag release state is shown on an upper half of FIG. 4 (i.e., above the center line X of the spool shaft) and a maximum drag state is shown on a lower half of FIG. 4 (i.e., below the center line X of the spool shaft).

The operation knob 51 has a fringed disk-shape knob 51a and a boss 51b. The boss 51b is integrally formed in a center of the knob 51a. The second sounding member 65 of the second sounding mechanism 48 is non-rotatably threaded into a back of a middle portion of the knob 51a in the radial direction. The boss 51b is threaded together with the male threaded portion 2a formed in the tip of the spool shaft 2. The operation knob 51 is retained by a retaining bolt 55 mounted to the base-end surface of the spool shaft 2.

The disk springs 52 are mounted to an outer circumference side of the boss 51b so as to be aligned with each other in the axial direction. The disk springs 52 are provided to minutely regulate the drag force by expansion and contraction thereof caused by rotation of the operation knob 51. The washer 53 is provided to transmit an urging force of the disk springs 52 to the push pin 54. The push pin 54 has a stepped portion with a tip and a large diameter portion. A diameter of the tip is smaller than a diameter of the large-diameter portion of the push pin 54. The push pins 54 are mounted to the three through holes 10f of the side plate 10 such that the large-diameter portion thereof is movable in the axial direction. The tip of the push pin 54 is passed through the first and second round holes 41a and 42a of the first and second brake disks 41 and 42. The push pins 54 non-rotatably engage the first and second brake disks 41 and 42 with respect to the reel unit 1. The stepped portion of the push pin 54 contacts the second brake disk 42. Thus, the second brake disk 42 is pressed by the push pin 54. When the spring force of the disk spring 52 is regulated by rotation of the operation knob 51, a frictional force among the first and second brake disks 41 and 42, the rotation disk 40, the drag ring 44, and the ring 45 is varied and thus, the drag force is regulated.

The first sounding mechanism 47 has a ring-shaped first sounding member 60, a first sounding pin 61 and a first coil spring 62. The first sounding pin 61 repeatedly collides against the first sounding member 60. The first coil spring 62 presses the first sounding pin 61 toward a first sounding member side. The first sounding mechanism 47 makes a sound when a drag force is activated, that is, when the first and second brake disks 41 and 42 and the rotation disk 40 are relatively rotated. The first sounding member 60 is non-rotatably mounted to the concave portion 40b of the rotation disk 40. The first sounding member 60 has a plurality of first sounding concave portions 60a. The first sounding concave portions 60a are formed on a lateral side of the first sounding member 60 on a first sounding pin side. The first sounding concave portions 60a are arranged at predetermined spaces in the circumferential direction. The first sounding pin 61 is movably mounted to the concave portion 10e formed on the inner surface of the side plate 10 in the axial direction. The first sounding pin 61 has a small-diameter spherical head. The first sounding pin 61 makes a short interval clicking sound by repeatedly colliding with the first sounding concave portion 60a formed on the first sounding member 60 when drag is activated.

The second sounding mechanism 48 has approximately the same configuration as the first sounding mechanism 47. The second sounding mechanism 48 has the second sounding member 65, a second sounding pin 66 and a second coil spring 67. The second sounding mechanism 48 makes a sound when the operation knob 51 is rotated. Also, the second sounding member 65 has a plurality of second sounding concave portions 65a. The second sounding concave portions 65a are formed on the second sounding member 65 at predetermined spaces in the circumferential direction.

During operation, a fishing line (not shown) is wound around an outer circumference of the bobbin trunk 15 of the spool 3. When the fishing line is wound, the spool 3 is rotated relative to the spool shaft 2 by an operation of the handle 16c. Here, the roller clutch 23 is disengaged. Therefore, the outer race 25 freely rotates and the spool 3 is allowed to rotate in the winding direction. Because of this, the spool 3 smoothly rotates.

When the fishing line is released from the spool 3, the spool 3 rotates in an opposite direction from which the spool 3 rotates when the fishing line is wound. Here, the roller clutch 23 is engaged. Therefore, the inner race 26 tries to rotate with the outer race 25. However, the first and second brake disks 41 and 42 and the ring 45 brake the inner race 26 through the rotation disk 40. Therefore, the resistance force (i.e., the drag force) set by the disk spring 52 is applied to the rotation force. Because of this, it is possible to prevent the spool 3 from rotating beyond what is necessary and prevent the fishing line from being excessively released. Accordingly, it is possible to avoid tangling of the fishing line.

In addition, when a fishing line is released in this way, the rotation disk 40 rotates with the spool 3 and the first and second brake disks 41 and 42 and the ring 45 is prevented from rotating. Therefore, the rotation disk 40 and the first brake disk 41 relatively rotate and the first sounding mechanism 47 makes a sound.

Figure 7:
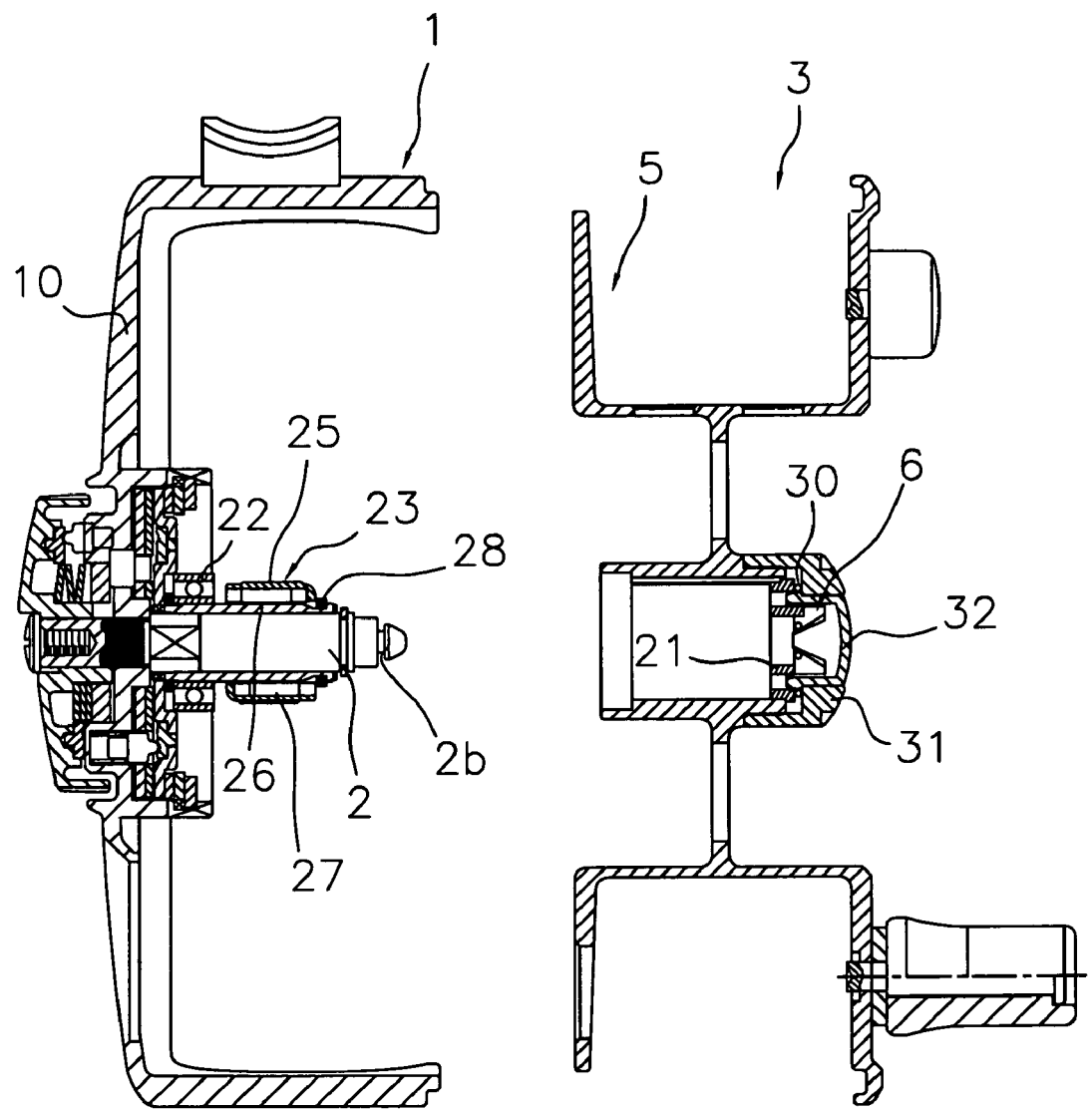
FIG. 7 is a partial cross-sectional view showing the single-bearing reel of FIG. 2 with the spool unit detached in accordance with the first embodiment of the present invention.

When the spool 3 is detached form the spool shaft 2, the push operation portion 32a of the push button 32 is pressed against the spool shaft 2. Thus, the tapered portion 32b will expand the gap between the first and second engagement portions 30a and 30b of the spring member 30 to release the engagement of the spool 3 and the first annular groove 2b of the spool shaft 2, thereby allowing the spool 3 to be detached/reattached. The spool 3 is detached from the spool shaft 2 when the spool 3 is pulled to the tip side (i.e., to the right side in FIG. 2) in such a state that the push button 32 is kept pushed. In addition, when the first and second engagement portions 30a and 30b are spread apart by the tapered portions 32b, the first and second engagement portions 30a and 30b will apply a force to the tapered portions 32b. Thus, the push operation portion 32a will be urged toward a direction opposite from the direction in which the push button 32 is pushed (toward the right side in FIG. 2). Because of this, when the push operation is stopped, the push button 32 will move to the tip side, and the first and second engagement portions 30a and 30b will return to a state in which they can engage with the spool shaft 2. Here, the one-way roller clutch 23 and the ball bearing 22 are kept mounted on the spool shaft 2. The sliding bearing 21 is detached from the spool shaft 2 with the spool 3, as shown in FIG. 7.

When the spool 3 is to be mounted on the spool shaft 2, the first and second engagement portions 30a and 30b of the spring member 30 are spread apart by the tapered head 2c of the spool shaft 2. Then, when the spring member 30 is positioned in the first annular groove 2b, the engagement portions 30a and 30b grasp the first annular groove 2b due to their resiliency. Thus the spool 3 is retained with respect to the spool shaft 2.

If the spool 3 is removed from the spool shaft 2, a winding direction of the fishing line can be changed to the opposite direction by changing the mounting direction of the roller clutch 23 to the opposite direction. In this case, the O-ring 28 is detached from the annular concave portion 26b of the inner race 26. Accordingly, the outer race 25 and the rollers 27 can be detached from the inner race 26. In this state, the outer race 25 and the rollers 27 are detached from the inner race 26. Then, the outer race 25 and the rollers 27 are reversed and remounted to the inner race 26. Next, the O-ring 28 is mounted and the outer race 25 is retained. Accordingly, it is easy to change the winding direction of the fishing line to the opposite direction. Here, an elastic ring member is used as a retaining member for the outer race 25 of the roller clutch 23. Therefore, the ring member can be easily detached/reattached from/to the inner race 26. Accordingly, it is easy to change the mounting direction of the roller clutch 23.

Second Embodiment

Figure 8:
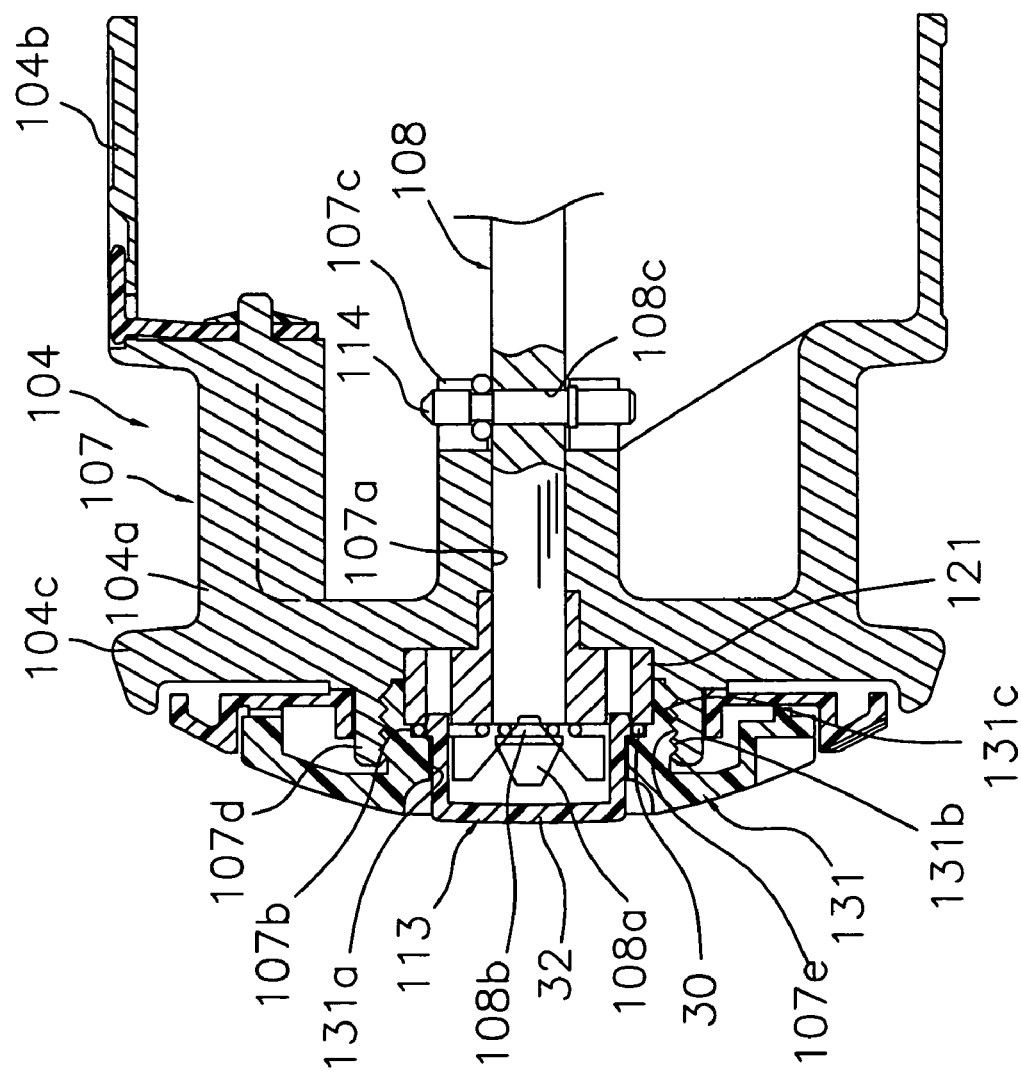
FIG. 8 is a partial cross-sectional view of a spool and a spool shaft of a spinning reel with a fishing reel component in accordance with a second embodiment of the present invention.

Referring now to FIG. 8, a fishing reel component in accordance with a second embodiment will now be explained. In view of the similarity between the first-and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment, the spool 3 of the single-bearing reel was described as an example of a fishing reel component. However, the present invention is not limited thereto. It will be apparent to one of skill in the art from this disclosure that the present invention can be applied to any fishing reel component as long as it is detachably/reattachably mounted to a shaft member. For example, in the second embodiment, a fishing reel component is applied to a spool 104 of a spinning reel. The fishing reel component is detachably/reattachably mounted to a spool shaft 108.

Referring to FIG. 8, the spool 104 is arranged between a first arm and a second arm of a rotor (not shown). The spool 104 is detachably/reattachably mounted with a one-touch operation and non-rotatably mounted on a tip of the spool shaft 108. The spool shaft 108 includes a tapered head 108a, an annular groove 108b and a pin hole 108c. The tapered head 108a is formed at the tip of the spool shaft 108. The annular groove 108b is formed to a rear side (i.e., to the right side in FIG. 8) of the tapered head 108a. The pin hole 108c is formed in the spool shaft 108 along a radial direction.

The spool 104 includes a spool unit 107 and a one-touch detachable/reattachable mechanism 113. The spool unit 107 includes a bobbin trunk 104a, a tubular skirt 104b and a front flange 104c. A fishing line (not shown) is wound around an outer circumference of the bobbin trunk 104a. The tubular skirt 104b is integrally formed on a rear end of the bobbin trunk 104a. The front flange 104c is formed on a front portion of the bobbin trunk 104a. The front flange 104c has a diameter that is larger than a diameter of the bobbin trunk 104a. The spool unit 107 is, for example, made of a metal such as an aluminum alloy, a magnesium alloy or a stainless steel alloy, or a synthetic resin such as polyamide synthetic resin.

The spool unit or component unit 107 has a through hole 107a, a mounting space 107b, a rotation stop groove 107c, a tubular projection 107d and a female threaded portion 107e. The spool shaft 108 passes through the through hole 107a. The through hole 107a is formed in a center of the spool unit 107. In addition, the tubular projection 107d is concentrically formed with the through hole 107a at a front end surface of the spool unit 107 through which the spool shaft 108 passes. The mounting space 107b is for mounting the one-touch detachable/reattachable mechanism 113. The mounting space 107b is formed inside the tubular projection 107d. The female threaded portion 107e is formed on an inner circumferential surface of the tubular projection 107d. The rotation stop groove 107c is formed along the radial direction at a rear end portion of the through hole 107a. A rotation stop pin 114 is mounted to the pin hole 108c of the spool shaft 108. The rotation stop pin 114 is also engaged with the rotation stop groove 107c. The spool 104 is made non-rotatable with respect to the spool shaft 108 by engagement of the rotation stop groove 107c with the rotation stop pin 114.

The one-touch detachable/reattachable mechanism 113 includes the resilient wire spring member 30, a lid member 131, the push button 32 and a spring arrangement member 121. The spring member 30 is engaged with the annular groove 108b of the spool shaft 108. The lid member 131 is screwed into the tubular projection 107d. The lid member 131 covers the mounting space 107b and retains the spring member 130. The push button 32 is movably mounted to the lid member 131 in an axial direction. The spring arrangement member 121 arranges the spring member 30 between the spring arrangement member 121 and the lid member 131. The spring arrangement member 121 is non-rotatably mounted to the spool unit 107.

The lid member 131 is a tubular member with a bottom. The lid member 131 includes a lid through hole 131a, a male threaded portion 131b and a tubular portion 131c. The through hole 131a movably supports the push button 32 in the axial direction. The through hole 131a is formed in a center of the lid member 131. The male threaded portion 131b is formed on an outer circumference of the tubular portion 131c. The male threaded portion 131b is threaded onto the inner circumferential surface of the tubular projection 107d via the female threaded portion 107e. An outer circumference of the lid member 131 is formed to cover a front surface of the front flange 104c.

The spring arrangement member 121 arranges the spring member 30 in the mounting space 107b. As in the case of the first embodiment, first and second through holes of the spring arrangement member 121 through which the tapered portion 32b and the guide portion 32c of the push button 32 can pass are formed in the spring arrangement member 121. In addition, first and second positioning protrusions of the spring arrangement member 121 are formed as in the case of the first embodiment.

With the second embodiment, it is possible to shorten a length of the one-touch detachable/reattachable mechanism 113 in the axial direction as in the first embodiment.

In the above described embodiments, the tapered portion 32b is formed on the push button tubular portion 32e. It will be apparent to one of skill in the art from this disclosure that the tapered portion 32b may be provided separately from the push button tubular portion 32e. For example, another tapered portion 32b may be provided on an inner circumferential side of the push button tubular portion 32e. The tapered portion 32b may be formed by cutting a portion of the push button tubular portion 32e. Furthermore, a guide portion 32c may be formed on the push button tubular portion 32e. In this case, it should be understood that a first through hole needs to be formed in the spring arrangement member 21, 121.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing reel component comprising:
   a component unit forming a through hole configured for a shaft member to pass therethrough and a mounting space formed at an end surface of the component unit and configured for the shaft member to pass therethrough;
   a spring member mounted in the mounting space, the spring member including first and second engagement portions arranged to oppose each other and configured to engage an annular groove at a tip of the shaft member;
   a lid member fixed to the component unit to retain the spring member and cover the mounting space;
   a push button including a push operation portion movably mounted to the lid member in an axial direction and outwardly exposed from a center of the lid member and a plurality of tapered portions provided to protrude from the push operation portion in the axial direction, each of the tapered portions having a tip inserted between the first and second engagement portions, the tapered portions being configured and arranged to expand a gap between the first and second engagement portions by movement of the tapered portions in the axial direction so that the engagement of the spring member and the annular groove of the shaft member is released by pushing the push operation portion; and
   a spring arrangement member provided for arranging the spring member between the lid member and the spring arrangement member, the spring arrangement member including a plurality of first through holes, each of the first through holes being configured for one of the tapered portions to pass therethrough.

2. The fishing reel component according to claim 1, wherein
   the mounting space is coaxially formed with the through hole, and
   the spring member is made from a resilient wire and includes a C-shaped connecting portion that connects an end of the first engagement portion with an end of the second engagement portion and wraps around another end of the first engagement portion and another end of the second engagement portion.

3. The fishing reel component according to claim 1, wherein
   the spring arrangement member includes a bushing for rotatably supporting the component unit with respect to the shaft member.

4. The fishing reel according to claim 1, wherein
   the push operation portion includes a tubular member that is movably mounted to the lid member in the axial direction, a portion of the tubular member is configured to be arranged on an outer circumferential side of the shaft member, the push operation portion further includes a bottom portion that is integrally formed with an end of the tubular portion and outwardly exposed through the center of the lid member, and
   the tapered portions are formed by cutting a portion of the tubular member.

5. The fishing reel component according to claim 1, wherein
   the push button further includes a pair of guide portions that is disposed between a pair of the tapered portions, the pair of the guide portions is arranged to be spaced apart from the pair of the tapered portions at a predetermined distance in a circumferential direction and the spring arrangement member further includes a plurality of second through holes, each of the second through holes is configured for one of the guide portions to pass therethrough.

6. The fishing reel component according to claim 5, wherein
   the spring arrangement member is non-rotatably mounted to the component unit, and
   a pair of the second through holes limits a position of the pair of guide portions so that a pair of tips of the pair of the tapered portions is arranged between the first and second engagement portions of the spring member.

7. The fishing reel component according to claim 1, wherein
   the spring arrangement member has a plurality of positioning projections that regulate a circumferential position of the spring member, and
   the spring arrangement member is arranged in the mounting space.

8. The fishing reel component according to claim 1, wherein
   the push button further includes a retaining protrusion that is formed on a tip of the tubular member, the retaining protrusion prevents the push button from coming away from the lid member.

9. The fishing reel component according to claim 1, wherein
   the shaft member is fixedly mounted to a reel unit of a single-bearing reel, and
   the component unit is configured for the single-bearing reel and is further configured to be rotatably and detachably/reattachably mounted to the shaft member.

10. The fishing reel component according to claim 1, wherein
    the shaft member is mounted to a reel unit of a spinning reel, and
    the component unit is configured for the spinning reel and is further configured to be rotatably and detachably/reattachably mounted to the shaft member.

* * * * *